United States Patent
Kim

(10) Patent No.: US 9,685,157 B2
(45) Date of Patent: Jun. 20, 2017

(54) VEHICLE AND CONTROL METHOD THEREOF

(71) Applicant: HYUNDAI MOTOR COMPANY, Seoul (KR)

(72) Inventor: Hyung Jin Kim, Incheon (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/709,139

(22) Filed: May 11, 2015

(65) Prior Publication Data
US 2016/0111089 A1    Apr. 21, 2016

(30) Foreign Application Priority Data
Oct. 16, 2014    (KR) .................... 10-2014-0139642

(51) Int. Cl.
G10L 15/00    (2013.01)
G10L 15/22    (2006.01)
G10L 13/08    (2013.01)

(52) U.S. Cl.
CPC .............. *G10L 15/22* (2013.01); *G10L 13/08* (2013.01); *G10L 2015/223* (2013.01)

(58) Field of Classification Search
CPC  G01C 21/3661; G01C 21/3688; G01C 21/26; B60R 16/0373; B60R 2011/0005;
(Continued)

(56) References Cited

U.S. PATENT DOCUMENTS

| 7,050,834 B2 * | 5/2006 | Harwood .............. H04M 1/271 379/420.01 |
| 7,676,363 B2 * | 3/2010 | Chengalvarayan ..... G10L 15/20 704/226 |

(Continued)

FOREIGN PATENT DOCUMENTS

| JP | 2000-310535 A | 11/2000 |
| JP | 2001-336939 A | 12/2001 |

(Continued)

OTHER PUBLICATIONS

Korean Notice of Allowance issued in Korean Application No. 10-2014-0139642, dated Dec. 1, 2015, with Partial English Translation.

*Primary Examiner* — Charlotte M Baker
(74) *Attorney, Agent, or Firm* — McDermott Will & Emery LLP

(57) ABSTRACT

A vehicle of recognizing received voice based on a language set in an external apparatus includes: a communication unit configured to receive text data stored in an external apparatus; a data converter configured to convert the received text data into voice data; a speech input unit configured to receive a speech from a user; a speech recognizer configured to recognize the received speech based on a language set in the external apparatus; and a controller configured to search for voice data corresponding to the recognized speech in the converted voice data, to generate a control command including the voice data found by the controller based on the recognized speech, and to transmit the control command to the external apparatus through the communication unit.

20 Claims, 19 Drawing Sheets

(58) Field of Classification Search
CPC .............. G06F 3/1454; G09G 2354/00; G09G 2380/10; H04M 1/6075; H04M 1/6083; G10L 15/005; H04W 4/02; H04W 4/046
USPC .... 704/239, 203, 275, 226, 243; 379/420.01
See application file for complete search history.

(56) References Cited

U.S. PATENT DOCUMENTS

| | | | | |
|---|---|---|---|---|
| 8,731,923 | B2 * | 5/2014 | Shu .................. | G10L 15/02 704/203 |
| 2008/0208578 | A1 * | 8/2008 | Geller ................ | G10L 15/063 704/243 |
| 2015/0162006 | A1 * | 6/2015 | Kummer .............. | G05B 11/01 704/275 |

FOREIGN PATENT DOCUMENTS

| | | |
|---|---|---|
| JP | 2002-144982 A | 5/2002 |
| JP | 2002-311987 A | 10/2002 |
| JP | 2008-096289 A | 4/2008 |
| JP | 2009-073428 A | 4/2009 |
| JP | 2014-034256 A | 2/2014 |
| KR | 2000-0073936 A | 12/2000 |
| KR | 10-2006-0050277 A | 5/2006 |
| KR | 10-2013-0133832 A | 12/2013 |

* cited by examiner

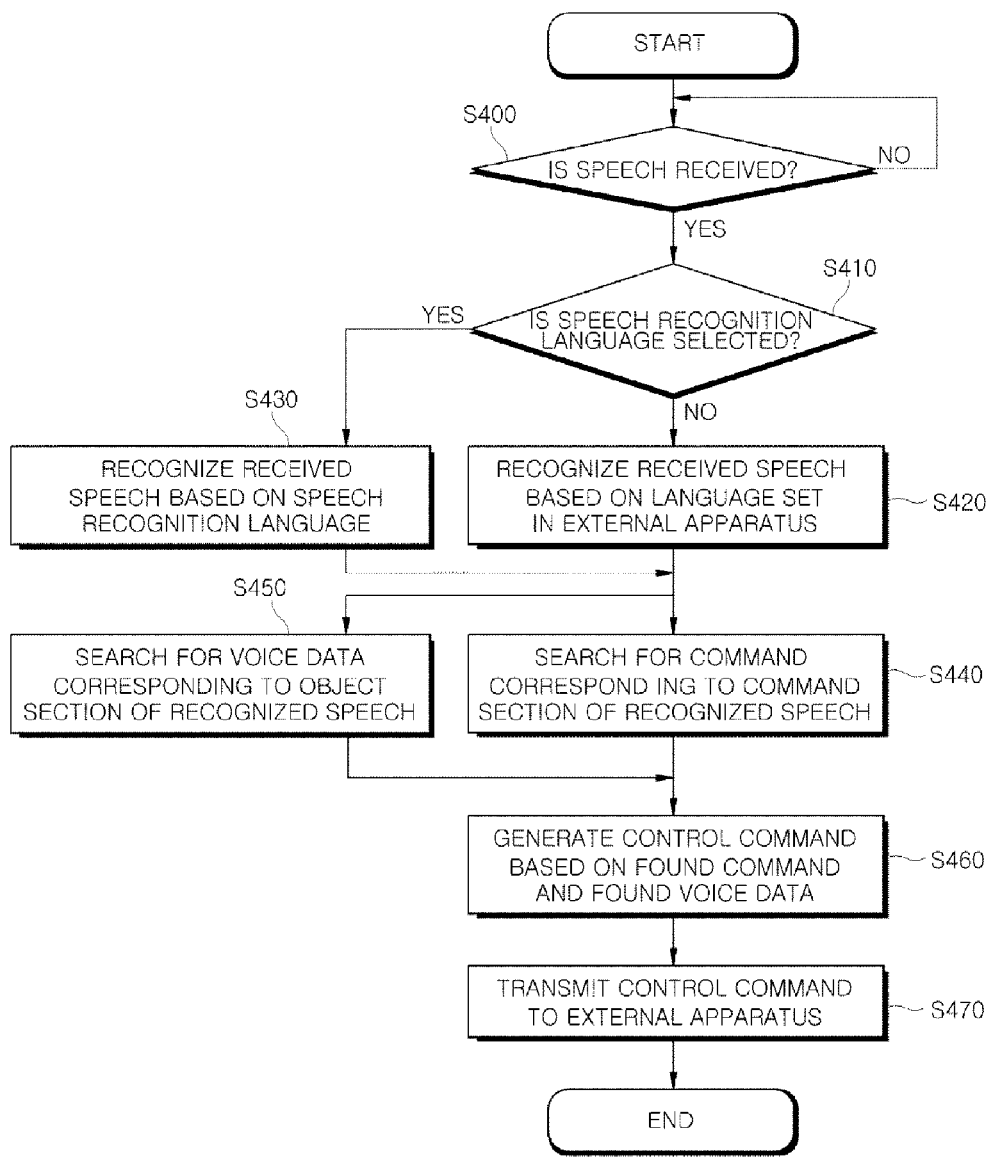

VEHICLE AND CONTROL METHOD THEREOF

CROSS-REFERENCE TO RELATED APPLICATION

This application claims the benefit of Korean Patent Application No. 10-2014-0139642, filed on Oct. 16, 2014 in the Korean Intellectual Property Office, the disclosure of which is incorporated herein by reference.

BACKGROUND

1. Technical Field

The present disclosure relates to a vehicle of recognizing a user's speech to perform a predetermined function according to the recognized speech, and a control method thereof.

2. Description of the Related Art

Along with development of vehicle technologies, various functions for improving a driver's convenience in addition to a driving function are provided for a vehicle.

However, as a vehicle provides more various functions, a driver's operation load increases to lower concentration on driving, resulting in interfering with safe driving. Further, drivers who are poor in operating machines may not properly use various functions that can be performed by their vehicles.

For this reason, studies into a user interface for reducing a driver's operation load are needed. For example, when speech recognition technology of recognizing a user's speech to perform a function corresponding to the recognized speech is applied to a vehicle, it is expected to effectively reduce a driver's operation load.

SUMMARY

Therefore, it is an aspect of the present disclosure to provide a vehicle of recognizing a received speech based on a language set in an external apparatus, and a control method of the vehicle.

Also, it is another aspect of the present disclosure to provide a vehicle of converting data received from an external apparatus into voice data based on a language set in the external apparatus to use the voice data for speech recognition, and a control method of the vehicle.

Additional aspects of the disclosure will be set forth in part in the description which follows and, in part, will be obvious from the description, or may be learned by practice of the disclosure.

In accordance with one aspect of the present disclosure, a vehicle includes: a communication unit configured to receive text data stored in an external apparatus; a data converter configured to convert the received text data into voice data; a speech input unit configured to receive a speech from a user; a speech recognizer configured to recognize the received speech based on a language set in the external apparatus; and a controller configured to search for voice data corresponding to the recognized speech in the converted voice data, to generate a control command including the voice data found by the controller based on the recognized speech, and to transmit the control command to the external apparatus through the communication unit.

The speech recognizer may recognize the received speech using at least one of an acoustic model and a language model corresponding to the language set in the external apparatus.

If the user selects a speech recognition language, the speech recognizer may recognize the received speech based on the speech recognition language selected by the user.

The speech recognizer may recognize the received speech using at least one of an acoustic model and a language model corresponding to the selected speech recognition language.

The speech recognizer may set a feature vector model according to the language set in the external apparatus, and compare the received speech to the feature vector model.

The speech recognizer may configure a state sequence according to the language set in the external apparatus, and compare the received speech to the state sequence.

In accordance with another aspect of the present disclosure, a vehicle includes: a communication unit configured to receive text data stored in an external apparatus; a data converter configured to convert the received text data into voice data based on a language set in the external apparatus; a speech input unit configured to receive a speech from a user; a speech recognizer configured to recognize the received speech; and a controller configured to search for voice data corresponding to the recognized speech in the converted voice data, to generate a control command including the found voice data based on the recognized speech, and to transmit the control command to the external apparatus through the communication unit.

The data converter may convert the received text data into the voice data using at least one of an acoustic model and a language model corresponding to the language set in the external apparatus.

If the user selects a voice data language, the data converter may convert the received text data into the voice data based on the voice data language selected by the user.

The data converter may convert the received text data into the voice data using at least one of an acoustic model and a language model corresponding to the voice data language selected by the user.

The data converter may convert the received text data into the voice data, with reference to a feature vector model corresponding to the language set in the external apparatus.

The data converter may convert the received text data into the voice data, with reference to a state sequence corresponding to the language set in the external apparatus.

In accordance with another aspect of the present disclosure, a control method of a vehicle includes: receiving text data stored in an external apparatus; converting the received text data into voice data; receiving a speech from a user; recognizing the received speech based on a language set in the external apparatus; searching for voice data corresponding to the recognized speech in the converted voice data; generating a control command including the found voice data based on the recognized speech; and transmitting the control command to the external apparatus.

The recognizing of the received speech may include recognizing the received speech using at least one of an acoustic model and a language model corresponding to the language set in the external apparatus.

The recognizing of the received speech may include recognizing, if the user selects a speech recognition language, the received speech based on the speech recognition language selected by the user.

The recognizing of the received speech may include recognizing the received speech using at least one of an acoustic model and a language model corresponding to the selected speech recognition language.

The recognizing of the received speech may include: setting a feature vector model according to the language set in the external apparatus; and comparing the received speech to the feature vector model.

The recognizing of the received speech may include: configuring a state sequence according to the language set in the external apparatus; and comparing the received speech to the state sequence.

In accordance with another aspect of the present disclosure, a control method of a vehicle includes: receiving text data stored in an external apparatus; converting the received text data into voice data based on a language set in the external apparatus; receiving a speech from a user; recognizing the received speech; searching for voice data corresponding to the recognized speech in the converted voice data; generating a control command including the found voice data, based on the recognized speech; and transmitting the control command to the external apparatus.

The converting of the received text data into the voice data may include converting the received text data into the voice data using at least one of an acoustic model and a language model corresponding to the language set in the external apparatus.

The converting of the received text data into the voice data may include converting, if the user selects a voice data language, the received text data into the voice data based on the voice data language selected by the user.

The converting of the received text data into the voice data may include converting the received text data into the voice data using at least one of an acoustic model and a language model corresponding to the voice data language selected by the user.

The converting of the received text data into the voice data may include converting the received text data into the voice data, with reference to a feature vector model corresponding to the language set in the external apparatus.

The converting of the received text data into the voice data may include converting the received text data into the voice data, with reference to a state sequence corresponding to the language set in the external apparatus.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 14 is a flowchart illustrating a speech recognition operation in a vehicle control method according to another embodiment of the present disclosure.

DETAILED DESCRIPTION

Figure 1:
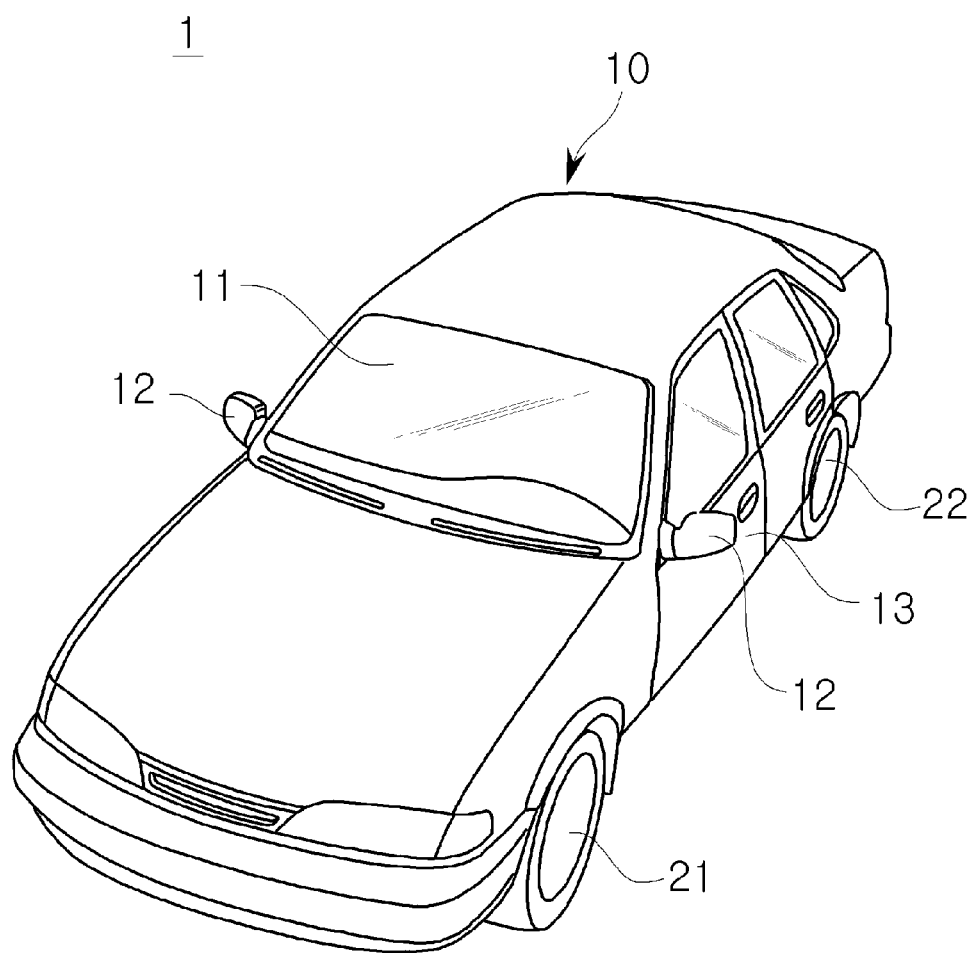
FIGS. 1 and 2 show an example of the exterior of a vehicle according to an embodiment of the present disclosure, and an example of the interior of a vehicle according to an embodiment of the present disclosure, respectively.

Reference will now be made in detail to the embodiments of the present disclosure, examples of which are illustrated in the accompanying drawings, wherein like reference numerals refer to like elements throughout.

Hereinafter, a vehicle, and a control method thereof will be described in detail with reference to the appended drawings.

In the following description, a "user" includes a driver and a passenger(s) who ride in a vehicle 100.

Figure 2:
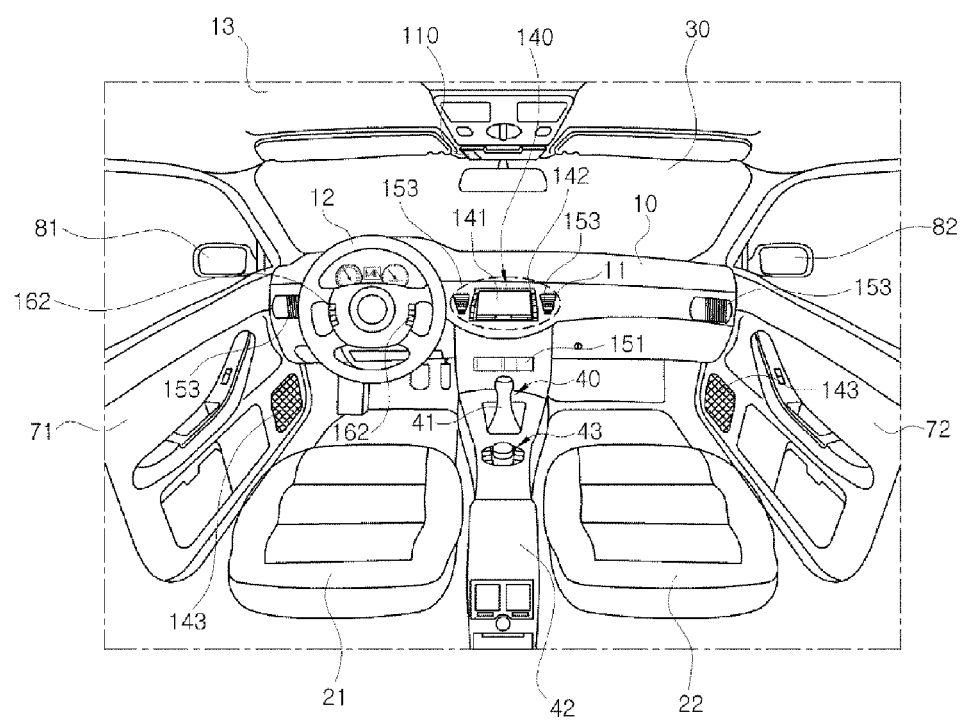

FIGS. 1 and 2 show an example of the exterior of a vehicle according to an embodiment of the present disclosure.

Referring to FIG. 1, a vehicle 100 according to an embodiment of the present disclosure may include a main body 1 forming an outer appearance of the vehicle 100, wheels 51 and 52 to move the vehicle 100, a driving apparatus 60 to rotate the wheels 51 and 52, doors 71 and 72 (see FIG. 2) to shield the interior of the vehicle 100 from the outside, a front glass 30 to provide a driver inside the vehicle 100 with a front view of the vehicle 100, and side-view mirrors 81 and 82 to provide the driver with rear views of the vehicle 100.

The wheels 51 and 52 may include front wheels 51 provided in the front part of the vehicle 100, and rear wheels 52 provided in the rear part of the vehicle 100. The driving apparatus 60 may provide rotatory power to the front wheels 51 or the rear wheels 52 so that the main body 1 moves forward or backward. The driving apparatus 60 may adopt an engine to burn fossil fuel to produce rotatory power, or a motor to receive power from a condenser (not shown) to produce rotatory power.

The doors 71 and 72 may be rotatably provided to the left and right of the main body 1 to allow the driver to open one of them and get into the vehicle 100. Also, the doors 71 and 72 shield the interior of the vehicle 100 from the outside when all of them close.

The front glass 30 may be provided in the upper, front part of the main body 1 to allow the driver inside the vehicle 100 to acquire a front view of the vehicle 100. The front glass 30 is also called a windshield glass.

The side-view mirrors 81 and 82 may include a left side-view mirror 81 provided to the left of the main body 1 and a right side-view mirror 82 provided to the right of the main body 1 to allow the driver inside the vehicle 100 to acquire side and rear views of the vehicle 100.

In addition, the vehicle 100 may include a proximity sensor to sense an obstacle or another vehicle behind or beside the vehicle 100, and a rain sensor to determine if it rains and to sense an amount of rainfall.

The proximity sensor may send a sensing signal backward or sideways from the vehicle 100, and receive a reflection signal reflected from an obstacle such as another vehicle. The proximity sensor may sense if an obstacle exists beside or behind the vehicle 100, and detect the location of the obstacle, based on the waveform of the received reflection signal. The proximity sensor may employ, for example, a method of sending ultrasonic waves or infrared rays and measuring a distance to an obstacle based on ultrasonic waves or infrared rays reflected from the obstacle.

Now, the interior of the vehicle 100 will be described with reference to FIG. 2, below.

In a center fascia 11 which is the center part of a dash board 10, an Audio Video Navigation (AVN) display 141 and an AVN input unit 142 may be positioned. Since an AVN apparatus 140 is equipment capable of executing an audio function, a video function, and a navigation function, the AVN display 140 may display at least one of an audio screen, a video screen, and a navigation screen, selectively, and also display various control screens related to the control of the vehicle 100 or screens related to additional functions that can be executed by the AVN apparatus 140.

The AVN display 141 may be implemented with Liquid Crystal Display (LCD), Light Emitting Diode (LED), Plasma Display Panel (PDP), Organic Light Emitting Diode (OLED), or Cathode Ray Tube (CRT).

A user may manipulate the AVN input unit 142 to input a command for controlling the AVN apparatus 140. The AVN input unit 142 may be located close to the AVN display 141, and implemented as a hard key type. Alternatively, if the AVN display 141 is implemented as a touch screen, the AVN display 141 may perform the function of the AVN input unit 142 together with a display function.

In the vehicle 100, a speaker 143 for outputting sound may be provided, and sound needed to perform the audio function, the video function, the navigation function, and other additional functions may be output through the speaker 143.

In an area of the dash board 10 located close to a driver seat 21, a steering wheel 12 may be provided. The steering wheel 12 may include a wheel input unit 162 to enable a driver to input commands related to the control of the vehicle 100 without taking his/her hand off the steering wheel 12 during driving.

Meanwhile, a center console 40 may include a center input unit 43 of a jog shuttle type or a hard key type. The center console 40 may be positioned between the driver seat 21 and a passenger seat 22, and include a gear transmission lever 41 and a tray 42. The center input unit 43 may perform all or a part of functions of the AVN input unit 142, or all or a part of functions of the wheel input unit 162.

The vehicle 100 may include an air conditioner that can perform both heating and cooling to discharge heated or cooled air through air vents 153 to thus control an internal temperature of the vehicle 100.

A user command for controlling an internal temperature of the vehicle 100 may be input through an air-conditioner input unit 151.

The vehicle 100 according to the current embodiment may be configured such that a user can input, with his/her voice, a control command which is input generally by manipulating the AVN input unit 142, the wheel input unit 162, or the center input unit 43, through a speech input unit 600.

In order to effectively receive the user's speech, the speech input unit 600 may be, as shown in FIG. 2, installed on a headlining 13. However, the speech input unit 600 may be installed on the dash board 10, on the steering wheel 12, or on any appropriate location at which a driving user's speech can be effectively received.

Until now, the outer appearance and interior of the vehicle 100 have been described with reference to FIGS. 1 and 2. Hereinafter, a process of speech recognition that is performed by the vehicle 100 will be described in detail.

Figure 3:
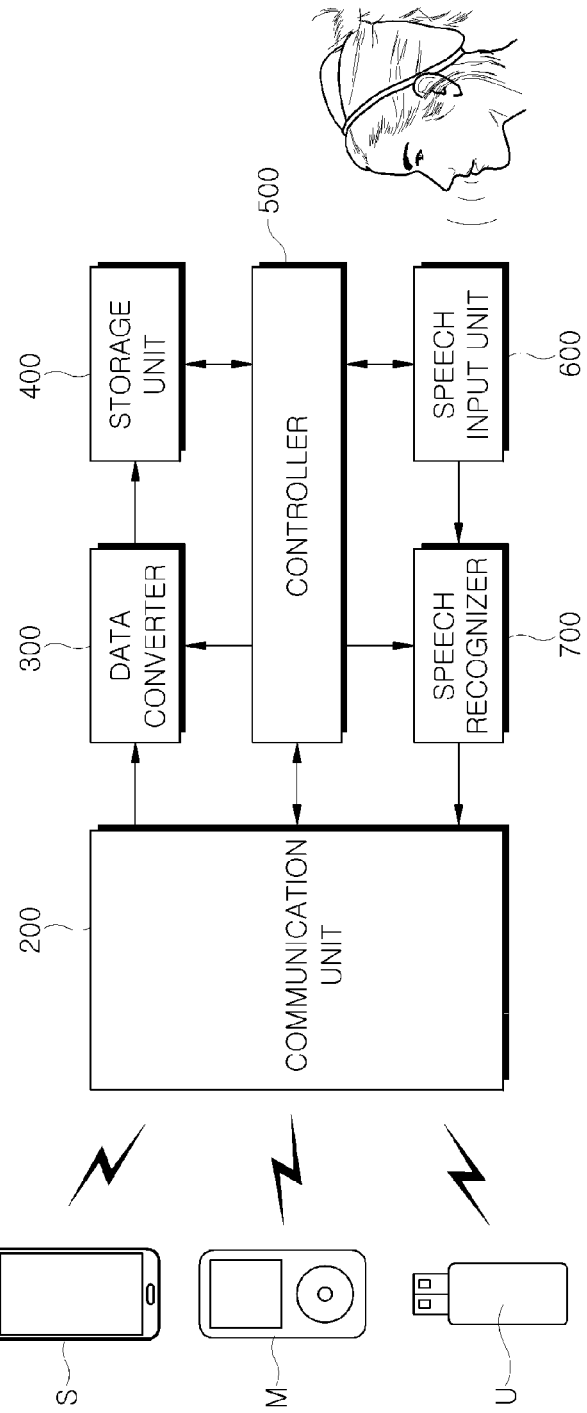
FIG. 3 is a control block diagram of a vehicle according to an embodiment of the present disclosure.

FIG. 3 is a control block diagram of the vehicle 100 according to an embodiment of the present disclosure;

Referring to FIG. 3, the vehicle 100 may include the speech input unit 600 to receive a user's speech, a speech recognizer 700 to recognize the user's speech, a controller 500 to control execution of an event corresponding to the recognized speech, and a storage 400 to store commands and events corresponding to the commands.

The speech input unit 600 may include a microphone. The speech input unit 600 may receive a speech uttered from the user, convert the received speech into an electrical signal, and then output the electrical signal to the speech recognizer 700. In the following description, the electrical signal converted by the speech input unit 600 is referred to as a speech signal.

The speech recognizer 700 may apply a speech recognition algorithm or a speech recognition engine to the speech signal received from the speech input unit 600 to recognize the user's speech.

The speech signal may be converted into another format that is more suitable for speech recognition. More specifically, the speech recognizer 700 may convert the received speech signal being an analog signal into a digital signal, and detect start and end points of the speech to detect an actual speech section included in the speech signal. This operation is called End Point Detection (EPD).

Then, the speech recognizer 700 may apply a feature vector extracting technology, such as Cepstrum, Linear Predictive Coefficient (LPC), Mel Frequency Cepstral Coefficient (MFCC), or Filter Bank Energy, to the detected speech section, thus extracting a feature vector of voice data (VD).

The speech recognizer 700 may compare the extracted feature vector to a trained reference pattern to acquire the results of recognition. At this time, the speech recognizer 700 may use an acoustic model of modeling and comparing the signal features of a speech, and a language model of modeling a linguistic order relation of a word or a syllable corresponding to a recognition vocabulary.

The acoustic model can be classified into a direct comparison method of setting a recognition target to a feature vector model, and comparing the feature vector model to a feature vector of a speech signal, and a statistical method of statistically processing a feature vector of a recognition target.

The direct comparison method is setting a unit, such as a word or a phoneme, which is a recognition target, to a feature vector model, and comparing a received speech to the feature vector model to determine similarity between them. A representative example of the direct comparison method is vector quantization. The vector quantization is mapping feature vectors of a received speech signal to a codebook that is a reference model to code the results of the mapping to representative values, and comparing the representative values to each other.

The statistical model method is configuring units of a recognition target as state sequences and using a relationship between the state sequences. Each state sequence may be configured with a plurality of nodes. The method of using the relationship between the state sequences can be classified into Dynamic Time Warping (DTW), Hidden Markov Model (HMM), and a method of using a neural network.

The DTW is a method of compensating for differences in the time axis through comparison to a reference model in consideration of the dynamic feature of speech that the length of a signal varies over time even when a person utters a pronunciation. The HMM is a recognition method of assuming a speech as a Markov process having state transition probability and observation probability of nodes (output symbols) in each state, then estimating state transition probability and observation probability of nodes based on learning data, and calculating probability at which a received speech will be generated from an estimated model.

Meanwhile, the language model of modeling a linguistic order relation of a word, a syllable, etc. can reduce acoustic ambiguity and recognition errors by applying an order relation between units configuring a language to units acquired through speech recognition. The language model may include a statistical language model, and a model based on Finite State Automata (FSA). The statistical language model uses chain probability of a word, such as Unigram, Bigram, and Trigram.

The speech recognizer 700 can use any one of the above-described methods for speech recognition. For example, the speech recognizer 700 may use an acoustic model to which the HMM is applied, or a N-best search method in which an acoustic model is combined with a speech model. The N-best search method can improve recognition performance by selecting N recognition result candidates or less using an acoustic model and a language model, and then re-estimating an order of the recognition result candidates.

The speech recognizer 700 may calculate a confidence score in order to ensure reliability of a recognition result. A confidence score, which is criteria representing how a speech recognition result is reliable, may be defined, with respect to a phoneme or a word being a recognized result, as a relative value of probability at which the corresponding phoneme or word has been uttered from different phonemes or words. Accordingly, a confidence score may be expressed as a value between 0 and 1 or between 1 and 100. If a confidence score of a certain recognition result is greater than a predetermined threshold value, the recognition result may be accepted, and if the confidence score of the recognition result is smaller than the predetermined threshold value, the recognition result may be rejected.

If a feedback indicating false recognition is received from a user although a confidence score is greater than a predetermined threshold value, that is, when false recognition occurs, the speech recognizer 700 may perform re-recognition. In this case, if the speech recognizer 700 applies the same recognition environment as the previous recognition environment, probability at which a recognition result will be improved is low. Accordingly, the speech recognizer 700 may set a recognition environment that is different from the previous recognition environment, and then again perform speech recognition.

Also, since the previous recognition result is not a result intended by the user, the speech recognizer 700 may exclude the previous recognition result from a search range for a re-recognition process. In this case, a search time can be shortened since a search range becomes narrower.

The speech recognizer 700 may be implemented in a computer-readable recording medium using software, hardware, or a combination of software and hardware. If the speech recognizer 700 is hardwarily implemented, the speech recognizer 700 may be implemented using at least one electric unit among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, and micro-controllers, and micro-processors. If the speech recognizer 700 is softwarily implemented, the speech recognizer 700 may be implemented together with a separate software module that performs at least one function or operation, and software code may be created by a software application that is written with an appropriate program language.

A speech uttered from a user may include a command for controlling the vehicle 100. The storage 400 may have stored such a command and an event corresponding to the command. Also, the storage 400 may have stored programs for processing and controlling of the speech recognizer 700 or the controller 500, and function to temporarily store data that is input/output.

The storage 400 may include at least one storage medium among flash memory, a hard disc, a memory card, Read-Only Memory (ROM), Random Access Memory (RAM), a memory card, Electrically Erasable Programmable Read-Only Memory (EEPROM), magnetic memory, a magnetic disc, and an optical disc.

The controller 500 may provide the user with the results of speech recognition by the speech recognizer 700, through the AVN display 141 or the speaker 143. For example, the controller 500 may provide the user with recognition result candidates having confidence scores that are greater than the predetermined threshold value, among N recognition result candidates.

Also, the controller 500 may perform a control operation for generating an event corresponding to a command recognized by the speech recognizer 700. For example, the controller 500 may call a specific person, control a navigation function, or control an audio function, according to a recognized command. Or, the controller 500 may control the internal temperature of the vehicle 100 using the air conditioner. The controller 500 may be, like the speech recognizer 700, implemented in a computer-readable recording medium using software, hardware, or a combination of software and hardware.

Meanwhile, the storage 400 may have stored, in addition to commands, objects that are objectives of the commands, in the form of voice data (VD). For example, a phone book that is an objective of "Call" being a command for making a call may have been stored as voice data in the storage 400, and a music list that is an objective of "Play" being a command for playing a song may have been stored as voice data in the storage 400.

In order to store voice data in the storage 400, the vehicle 100 may further include a communication unit 200 to receive data stored in an external apparatus and a data converter 300 to convert received data into voice data.

Referring to FIG. 3, the communication unit 200 may connect to an external apparatus in which data can be stored, and receive/transmit data from/to the external apparatus. In FIG. 3, a case in which the communication unit 200 connects to a smart phone S, a MPEG audio layer-3 (MP3) player M, and a Universal Serial Bus (USB) U is shown.

The communication unit 200 may connect to an external apparatus in a wired fashion through a connector 170 (see FIG. 4B), such as an auxiliary (AUX) port or a USB port. Alternatively, the communication unit 200 may connect to an external apparatus through a short-range communication method, such as Bluetooth and Zigbee, or the communication unit 200 may connect to an external network according to a wireless communication protocol, such as Wireless Fidelity (WiFi) and an Institute of Electrical and Electronics Engineers (IEEE) standard, to communicate with an external apparatus.

Figure 4A:
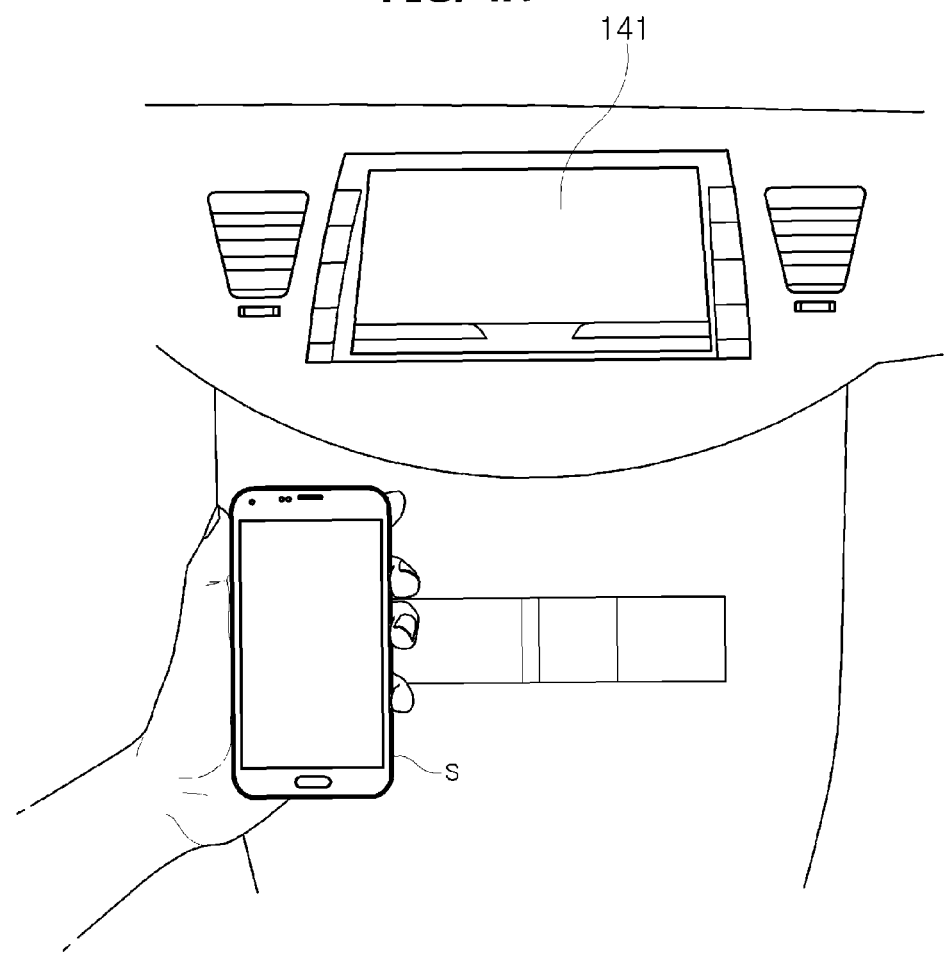
FIGS. 4A and 4B are views for describing various embodiments of communication methods that are performed by a communication unit of a vehicle according to an embodiment of the present disclosure.
Figure 4B:
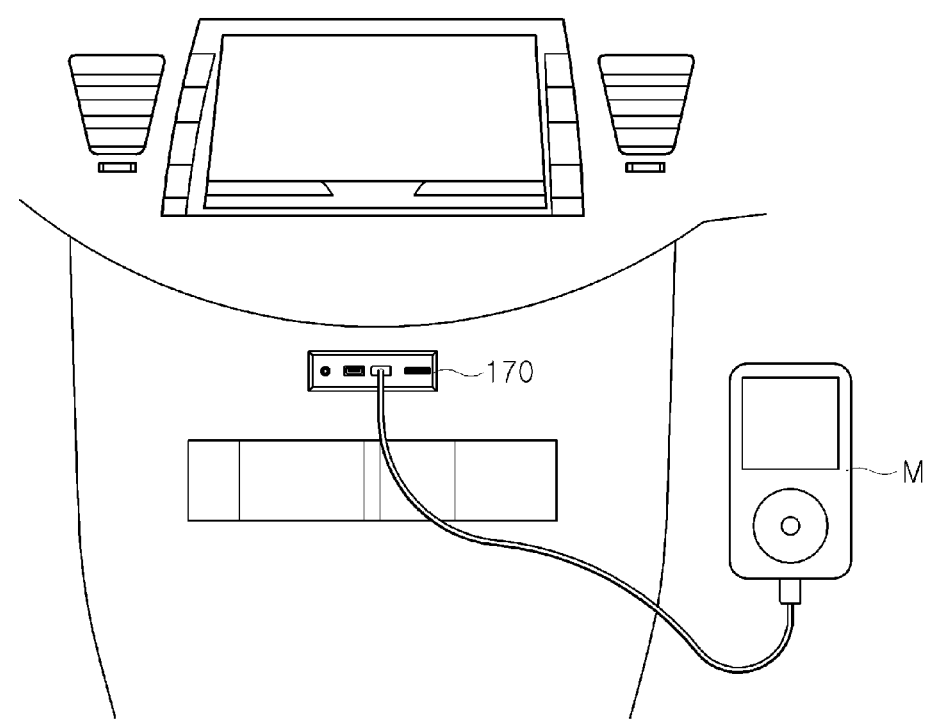

FIGS. 4A and 4B are views for describing various embodiments of communication methods that are performed by the communication unit 200 of the vehicle 100 according to an embodiment of the present disclosure.

FIG. 4A shows a case in which the communication unit 200 connects to an external apparatus through wireless communication.

As shown in FIG. 4A, the communication unit 200 may connect to a smart phone S through wireless communication. For example, the communication unit 200 may perform data communication with the smart phone S through Bluetooth.

In order to perform data communication with the smart phone S, the communication unit 200 may search for an external apparatus allowing Bluetooth communication within a predetermined Bluetooth communication area. If the smart phone S is found as a communicable external apparatus, the communication unit 200 may perform pairing with the smart phone S according to a user's selection or automatically. After the pairing is completed, the communication unit 200 can receive/transmit data from/to the smart phone S.

After the pairing is performed, the smart phone S may move out of the predetermined Bluetooth communication area so that the communication unit 200 can no longer perform Bluetooth communication with the smart phone S. Thereafter, if the smart phone S moves within the predetermined Bluetooth communication area, the communication unit 200 may search for the smart phone S automatically to perform pairing with the smart phone S.

Also, the communication unit 200 may receive a predetermined password from the smart phone S, and then perform pairing with the smart phone S. The password may be decided by a user's input or by calculation of the smart phone S.

However, the communication unit 200 may connect to a network to which the smart phone 3 connects, thus communicating with the smart phone S. For example, the communication unit 200 may communicate with the smart phone S through WiFi.

FIG. 4B shows a case in which the communication unit 200 connects to an external apparatus through wired communication.

As shown in FIG. 4B, the communication unit 200 may connect to a MP3 player M through wired communication. For example, the communication unit 200 may perform data communication with the MP3 player M through the connector 170 and a cable C connected to the connector 170.

The communication unit 200 may receive data stored in the external apparatus from the external apparatus using one of various communication methods. More specifically, the communication unit 200 may receive text data (TD) stored in the external apparatus.

For example, in the case of FIG. 4A, the communication unit 200 may receive a phone book in the form of text data, stored in the smart phone S. More specifically, text data received by the communication unit 200 may be a table in which a plurality of names are mapped to a plurality of phone numbers, respectively.

As another example, in the case of FIG. 4B, the communication unit 200 may receive a music list in the form of text data, stored in the MP3 player M. More specifically, text data received by the communication unit 200 may be a table including characters for identifying a plurality of songs that can be played by the MP3 player M. For example, the communication unit 200 may receive, as text data, a table including titles of a plurality of songs that can be played by the MP3 player M.

The data converter 300 may convert the text data received by the communication unit 200 into voice data (VD). Herein, the voice data may include phonetic symbols of text data according to a predetermined language. Accordingly, when the speech recognizer 700 (see FIG. 3) recognizes a speech, voice data converted by the data converter 300 may be a recognition target.

In order to convert the text data into voice data, the data converter 300 may refer to the acoustic model and the language model used by the speech recognizer 700. Particularly, if the data converter 300 refers to the acoustic model, the data converter 300 may convert the text data into voice data with reference to feature vector models that are adopted in the direct comparison method. Also, the data converter 300 may convert the text data into voice data with reference to state sequences that are used in the statistical model method.

The voice data may be stored in the storage 400, and can be, when a speech is received from the user, used to recognize the received speech.

A language set in the external apparatus may be different from a base language of speech recognition. If a language set in the external apparatus is different from a base language of speech recognition, text data of the external apparatus may be converted into voice data according to the base language of speech recognition. Also, when the user utters a speech of the same language set in the external apparatus, speech recognition may be performed based on the base language of speech recognition.

As a result, a recognition rate of the speech uttered by the user may be lowered, which may make execution of the user's desired event difficult.

In order to overcome the problem, there are a method <1> of converting text data of the external apparatus into voice data based on a language set in the external apparatus, and a method <2> of recognizing a speech received from a user based on a language set in the external apparatus.

First, the method <1> of converting text data of the external apparatus into voice data based on a language set in the external apparatus will be described.

Figure 5:
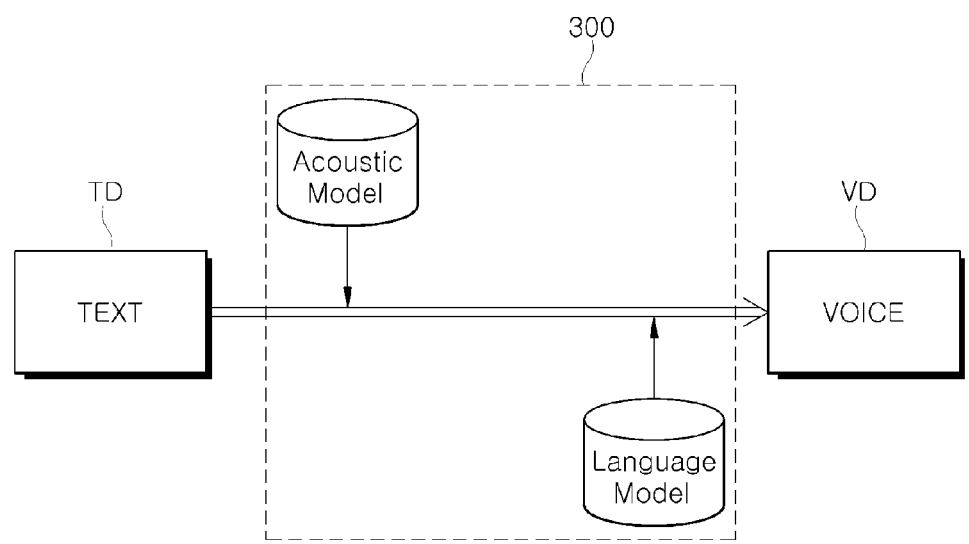
FIG. 5 is a view for describing operations of a data converter of a vehicle according to an embodiment of the present disclosure.

FIG. 5 is a view for describing operations of the data converter 300 of the vehicle 100 according to an embodiment of the present disclosure.

As described above, the data converter 300 may convert text data of an external apparatus into voice data. The voice data may include phonetic symbols of the text data when the text data is pronounced in a predetermined language.

The data converter 300 may convert the text data into voice data based on a language set in the external apparatus. More specifically, the data converter 300 may convert the text data into phonetic symbols of the text data when the text data is pronounced based on a language set in the external apparatus.

In order to convert the text data into the phonetic symbols of the text data when the text data is pronounced based on the language set in the external apparatus, the data converter 300 may refer to an acoustic model and a language model corresponding to the language set in the external apparatus.

Particularly, since the acoustic model models signal features of a speech, the data converter 300 may convert the text data into voice data such that signal features of the language set in the external apparatus are reflected to the voice data.

For example, if the direct comparison method of the acoustic model is adopted, the data converter 300 may refer to feature vector models corresponding to the language set in the external apparatus. As a result, the data converter 300 may acquire voice data as a result to which feature vector models in the language set in the external apparatus are reflected when the text data is pronounced in the language set in the external apparatus.

As another example, if the statistical model method of the acoustic model is adopted, the data converter 300 may refer to state sequences corresponding to the language set in the external apparatus. As a result, the data converter 300 may acquire voice data as a result to which a relation between state sequences in the language set in the external apparatus is reflected when the text data is pronounced in the language set in the external apparatus.

Figure 6:
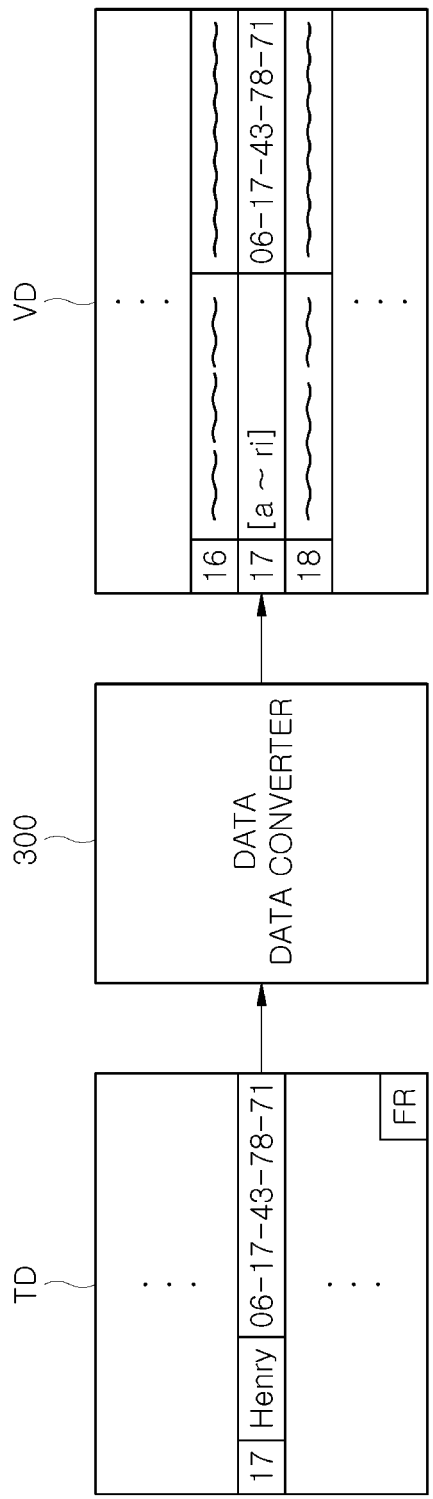
FIG. 6 is a view for describing an embodiment of an operation of a data converter of a vehicle according to an embodiment of the present disclosure.

FIG. 6 is a view for describing an embodiment of an operation of the data converter 300 of the vehicle 100 according to an embodiment of the present disclosure. In FIG. 6, a case in which text data is a phone book stored in a smart phone S, and a language set in the smart phone S is French is assumed.

As shown in FIG. 6, the text data may be a table (that is, a phone book) in which a plurality of names are mapped to a plurality of phone numbers, respectively.

The data converter 300 may receive the phone book, and convert the phone book into voice data. At this time, the data converter 300 may acquire voice data based on French that is a language set in the smart phone S.

For example, text data "Henry" included in the phone book may be converted into voice data by the data converter 300. Since the data converter 300 converts data based on a language set in the smart phone S, the data converter 300 may acquire, as voice data, "[a~ri]" that is a French pronunciation of "Henry".

If a user selects a voice data language as a base language of speech recognition, the data converter 300 may acquire voice data according to the language selected by the user.

In the example of FIG. 6, when the user sets a voice data language to German, the data converter 300 may acquire, as voice data, phonetic symbols of "Henry" in German, not in French which is a language set in the smart phone S.

Now, the method <2> of recognizing a speech received from a user based on a language set in an external apparatus will be described.

Figure 7:
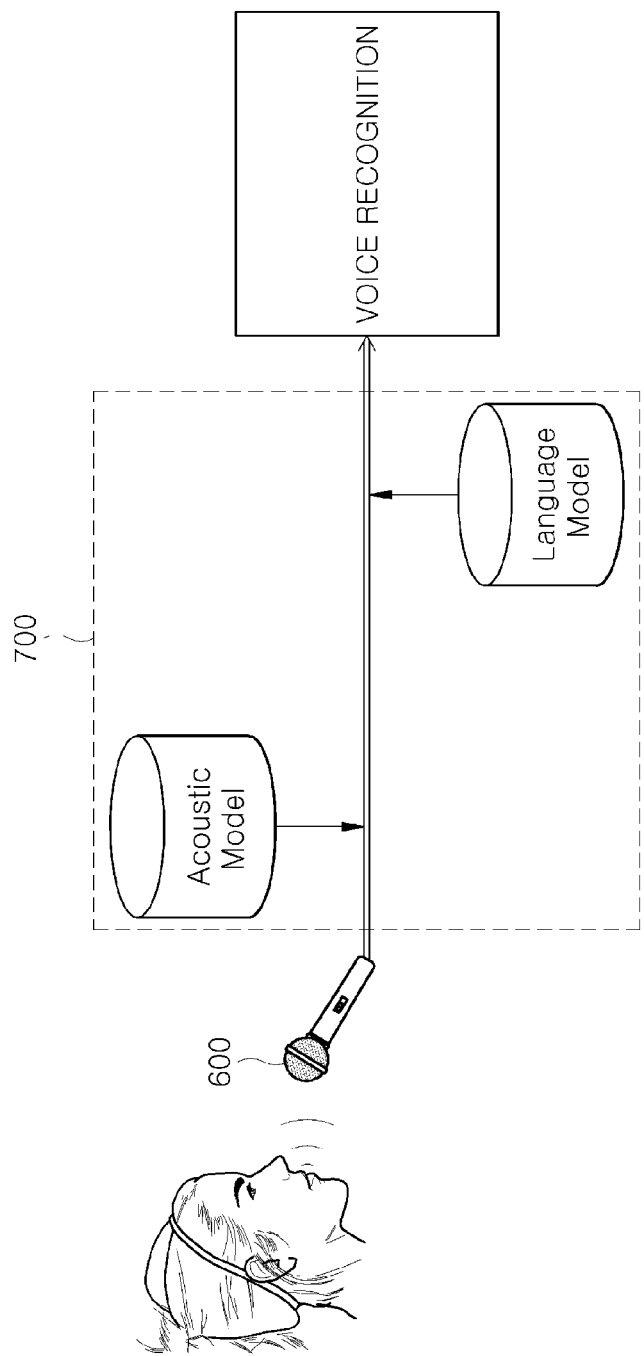
FIG. 7 is a view for describing operations of a speech recognizer of a vehicle according to an embodiment of the present disclosure.

FIG. 7 is a view for describing operations of the speech recognizer 700 of the vehicle 100 according to an embodiment of the present disclosure.

As described above, the speech recognizer 700 may recognize a speech received from a user. At this time, speech recognizer 700 may recognize the speech received from the user, based on a language set in an external apparatus.

More specifically, the speech recognizer 700 may recognize the speech received from the user, using an acoustic model and a language model corresponding to the language set in the external apparatus.

For example, if the direct comparison method of the acoustic model is adopted, the speech recognizer 700 may set feature vector models according to the language set in the external apparatus. Then, the speech recognizer 700 may compare the received speech to the feature vector models to perform speech recognition.

Meanwhile, if the statistical model of the acoustic model is adopted, the speech recognizer 700 may configure state sequences according to the language set in the external apparatus. Then, the speech recognizer 700 may compare the speech received from the user to a relationship between the state sequences to perform speech recognition.

In FIG. 7, when a user utters a speech "Henry", the speech recognizer 700 may recognize the user's speech according to a language set in an external apparatus. If the language set in the external apparatus is French, the speech recognizer 700 may recognize the speech "Henry" uttered by the user as "[a~ri]".

Also, the speech recognizer 700 may refer to state sequences corresponding to the language set in the external apparatus. As a result, the data converter 300 may acquire voice data resulting from reflecting a relationship between state sequences of the language set in the external apparatus to a pronunciation of the text data in the corresponding language.

If the user selects a speech recognition language that is a base language of speech recognition, the speech recognizer 700 may recognize the speech according to the language selected by the user.

Like the above-described example, if the user sets a speech recognition language to German, the speech recognizer 700 may recognize the user's speech based on German, not French that is a language set in the external apparatus.

Referring again to FIG. 3, after text data stored in the external apparatus is converted into voice data according to the method <1>, and a user's speech is recognized according to the method <2>, the controller 500 may search for voice data corresponding to the recognized speech.

Figure 8:
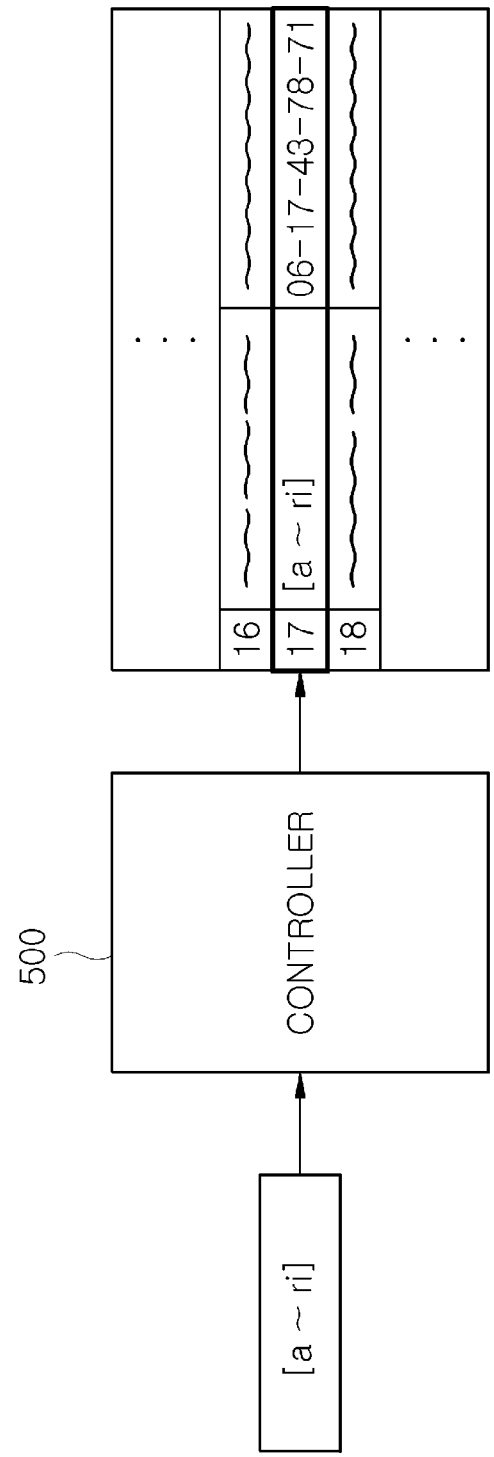
FIG. 8 is a view for describing an embodiment of an operation of a controller of a vehicle according to an embodiment of the present disclosure.

FIG. 8 is a view for describing an embodiment of an operation of the controller 500 of the vehicle 100 according to an embodiment of the present disclosure.

The controller 500 may divide a recognized speech into a command section and an object section that is an objective of the command. Then, the controller 500 may search for a command corresponding to the command section in the storage 400.

Also, the controller 500 may search for voice data corresponding to the object section in the storage 400.

In the embodiment of FIG. 8, the controller 500 may determine that the speech recognizer 700 has recognized a user's speech as "[a~ri]", and search for voice data corresponding to "[a~ri]" in the storage 400. As a result, the controller 500 may determine that the voice data has been stored to correspond to a number 17 in a phone book.

Also, the controller 500 may generate a control command including determined speech recognition data, and transmit the control command to the external apparatus. This operation will be described with reference to FIGS. 9A to 9c and 10A to 10C, below.

Figure 9A:
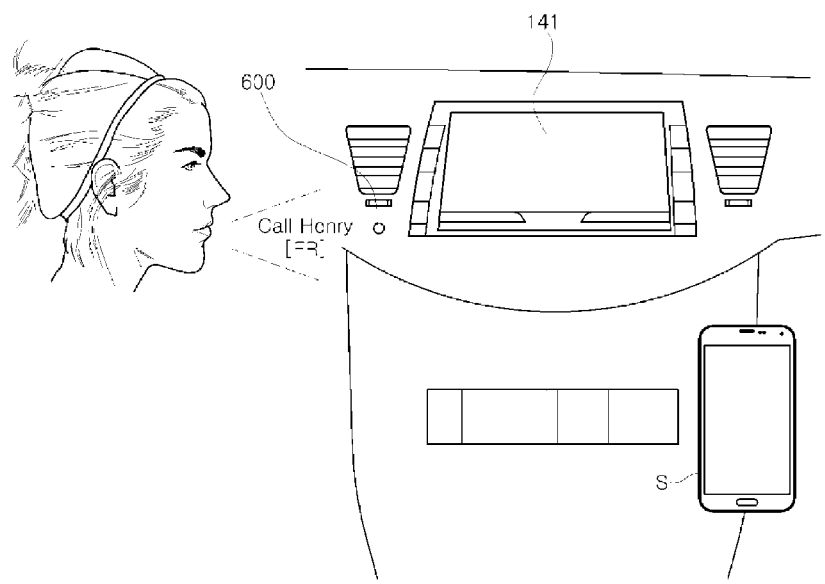
FIGS. 9A, 9B, and 9C are views for describing an embodiment of an operation of a controller of a vehicle according to an embodiment of the present disclosure.
Figure 9B:
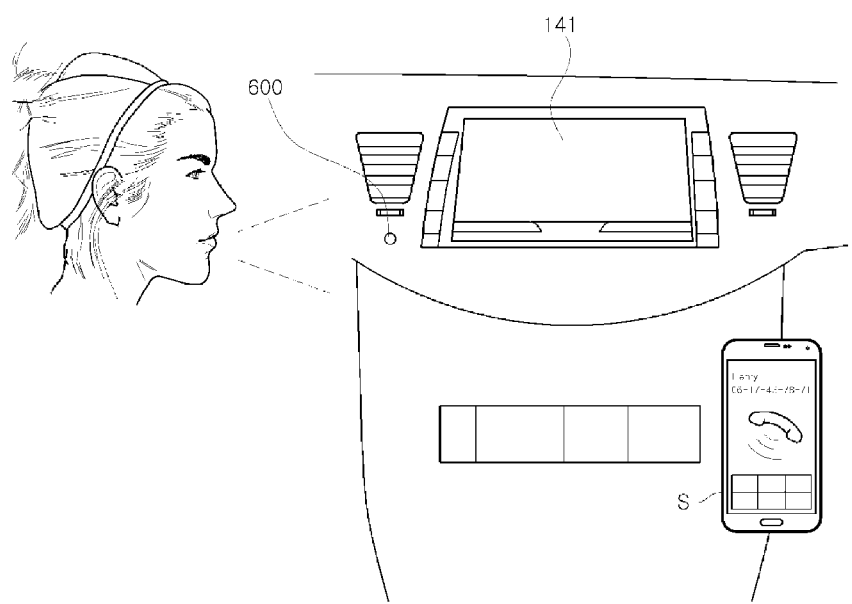
Figure 9C:
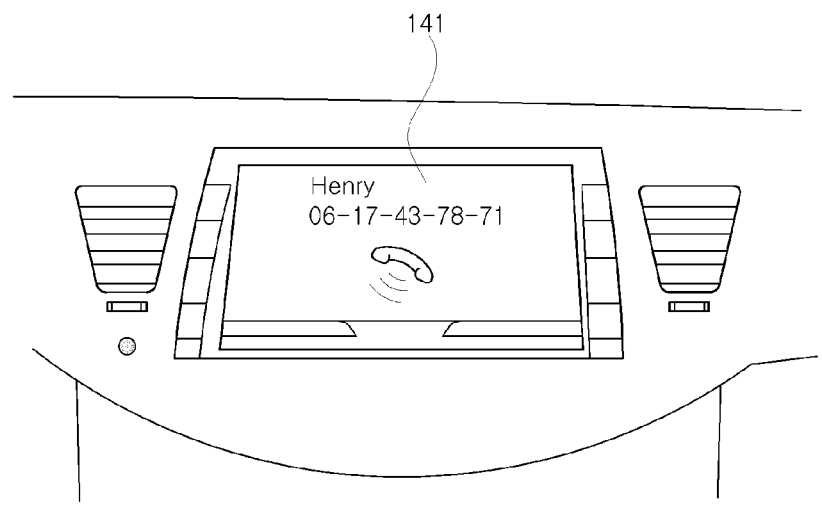

FIGS. 9A, 9B, and 9C are views for describing an embodiment of an operation of the controller 500 of the vehicle 100 according to an embodiment of the present disclosure.

In FIGS. 9A to 9C, an external apparatus is assumed to be a smart phone S, text data is assumed to be a phone book stored in the smart phone S, and a language set in the smart phone S is assumed to be French.

Referring to FIGS. 3 and 9A, a user of the smart phone S may utter "Call Henry" in French. Then, the speech input unit 600 may receive the user's speech "Call Henry", and transfer the user's speech to the speech recognizer 700. The speech recognizer 700 may recognize "Call Henry" based on French that is the language set in the smart phone S.

The controller 500 may search for voice data corresponding to an object section "[a~ri]", as described above in the embodiment of FIG. 8. Also, the controller 500 may search for a command corresponding to a command section "Call". Herein, the command "Call" is assumed to be a command for making a call.

Then, the controller 500 may generate a control command for making a call with a phone number corresponding to a name of the found voice data. Finally, the controller 500 may transmit the control command to the smart phone S.

FIG. 9B shows a case in which after the controller 500 transmits the control command to the smart phone S, the smart phone S makes a call with a phone number "06-17-43-78-71" corresponding to "Henry".

As such, by performing speech recognition in consideration of a language set in an external apparatus, the accuracy of speech recognition can be improved.

Also, if the smart phone S is paired with the vehicle 100, a screen displayed on the smart phone S may be displayed on the AVN display 141, as shown in FIG. 9C. In this case, the user can control the smart phone S through the AVN display 141 of the vehicle 100, without touching the smart phone S.

Figure 10A:
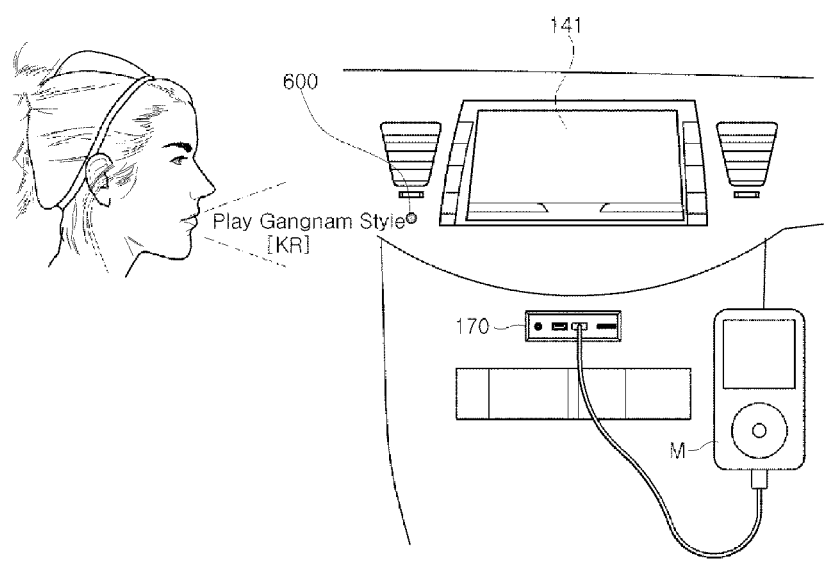
FIGS. 10A, 10B, and 10C are views for describing another embodiment of an operation of a controller of a vehicle according to an embodiment of the present disclosure.
Figure 10B:
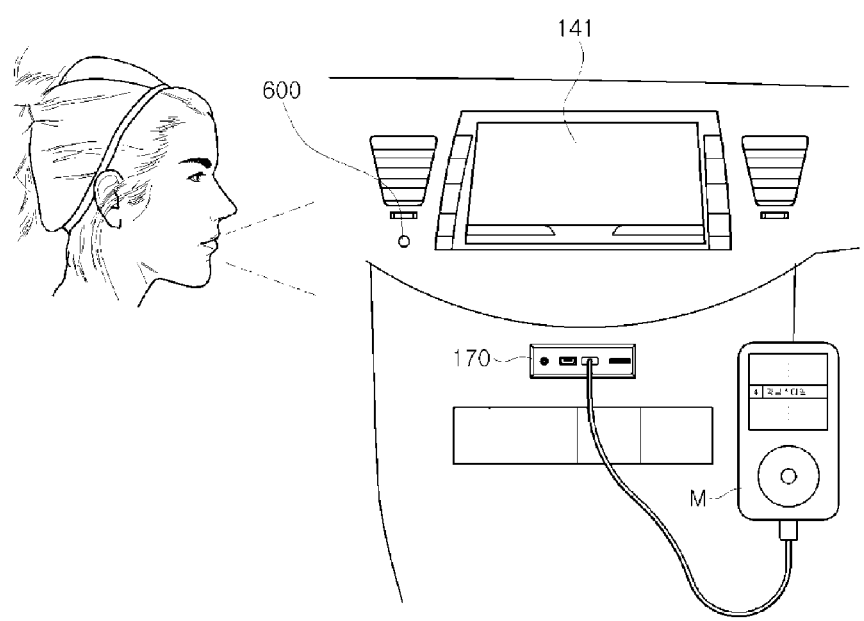
Figure 10C:
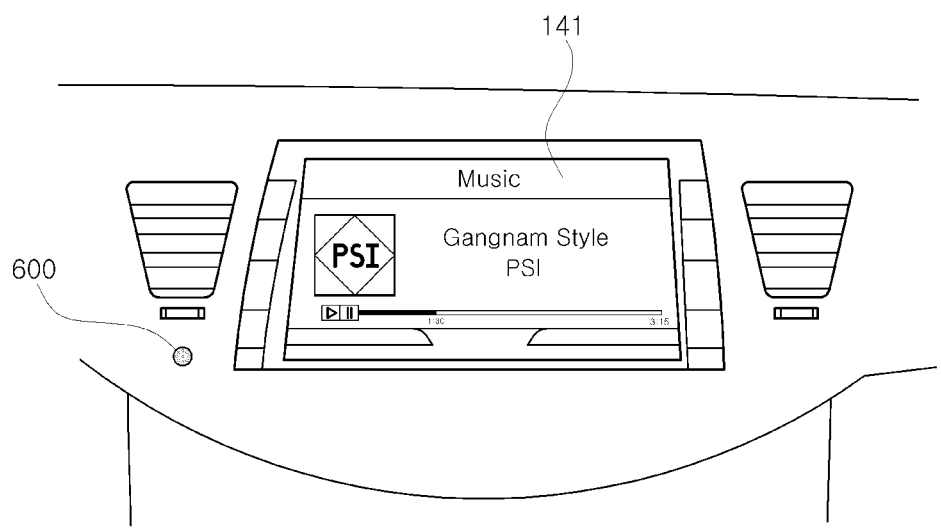

FIGS. 10A, 10B, and 10C are views for describing another embodiment of an operation of the controller 500 of the vehicle 100 according to an embodiment of the present disclosure.

In FIGS. 10A to 10C, an external apparatus is assumed to be a MP3 player M, text data is assumed to be titles of songs that can be played by the MP3 player M, and a language set in the MP3 player M is assumed to be Korean.

As shown in FIG. 10A, a user of the MP3 player M with a language setting of Korean may utter "Play Gangnam Style" in Korean. Then, the speech input unit 600 may receive the user's speech "Play Gangnam Style", and transfer the received speech to the speech recognizer 700. The speech recognizer 700 may recognize "Play Gangnam Style" based on Korean that is the language set in the MP3 player M.

The controller 500 may search for voice data corresponding to an object section "Gangnam Style". Also, the controller 500 may search for a command corresponding to a command section "Play". Herein, a command "Play" is assumed to be a command for playing a song.

Then, the controller 500 may generating a control command for playing a song corresponding to a title of song of the found voice data. Finally, the controller 500 may transmit the control command to the MP3 player M.

FIG. 10B shows a case in which after the controller 500 transmits the control command to the MP3 player M, the MP3 player M plays a song corresponding to a title of song "Gangnam Style". Likewise, in this case, by performing speech recognition in consideration of Korean that is the language set in the external apparatus, the accuracy of speech recognition can be improved.

Also, as shown in FIG. 10C, a screen displayed on the MP3 player M may be displayed on the AVN display 141. In this case, a user can control the MP3 player M through the AVN display 141 of the vehicle 100, without manipulating the MP3 player M.

Figure 11:
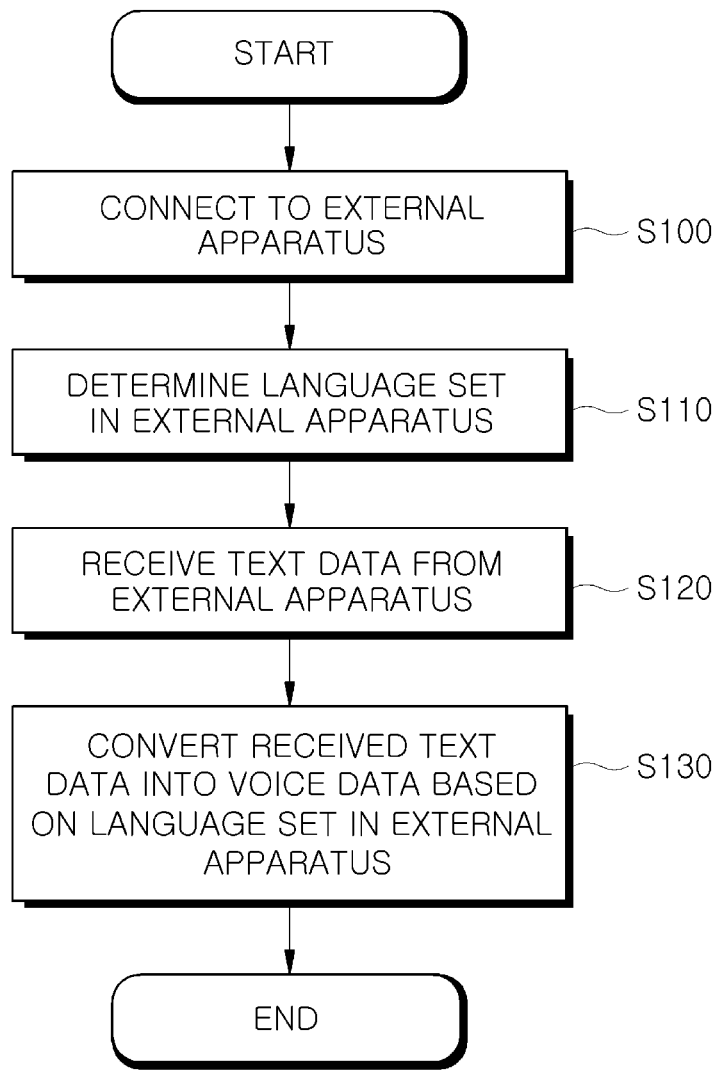
FIG. 11 is a flowchart illustrating an operation for conversion into voice data in a vehicle control method according to an embodiment of the present disclosure.

FIG. 11 is a flowchart illustrating an operation for conversion into voice data in a vehicle control method according to an embodiment of the present disclosure.

First, a vehicle may connect to an external apparatus, in operation S100. Herein, the external apparatus may be any apparatus that can store text data.

In order to connect to the external apparatus, various communication methods can be adopted. For example, the vehicle may connect to the external apparatus in a wired fashion through a cable C, or in a wireless fashion by connecting to the same network to which the external apparatus connects.

Then, the vehicle may determine a language set in the external apparatus, in operation S110. Since the accuracy of speech recognition is lowered if a base language of speech recognition of the vehicle is different from a language set in the external apparatus, a language set in the external apparatus is reflected to speech recognition.

After determining a language set in the external apparatus, the vehicle may receive text data from the external apparatus, in operation S120. The text data received from the external apparatus may include a phone book and a music list.

Finally, the vehicle may convert the received text data into voice data, based on the language set in the external apparatus, in operation S130. More specifically, the vehicle may convert the received text data into voice data, based on an acoustic model and a language model corresponding to the language set in the external apparatus.

Figure 12:
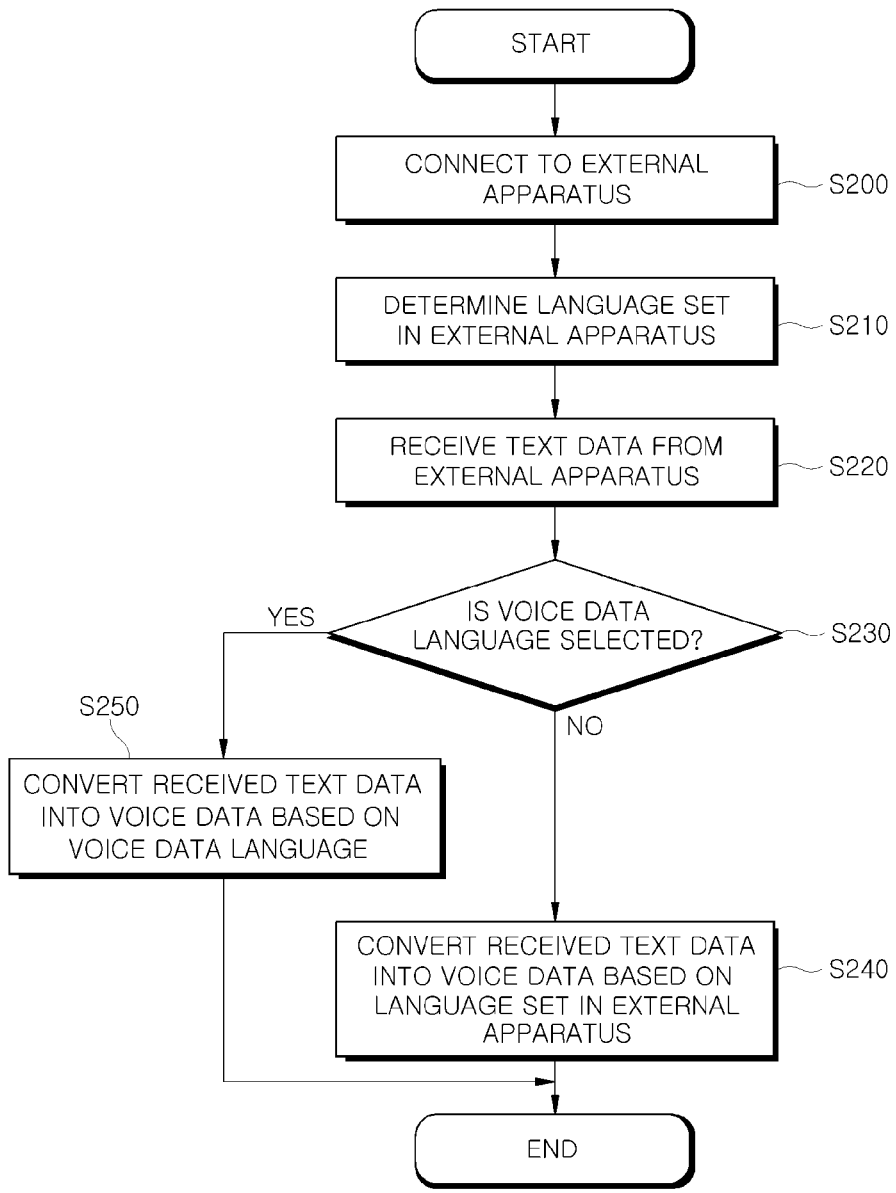
FIG. 12 is a flowchart illustrating an operation for conversion into voice data in a vehicle control method according to another embodiment of the present disclosure.

FIG. 12 is a flowchart illustrating an operation for conversion into voice data in a vehicle control method according to another embodiment of the present disclosure.

First, a vehicle may connect to an external apparatus, in operation S200. In order to connect to the external apparatus, various communication methods can be adopted, as described above with reference to FIG. 11.

Then, the vehicle may determine a language set in the external apparatus, in operation S210, and receive text data from the external apparatus, in operation S220.

After receiving the text data, the vehicle may determine whether a voice data language is selected by a user, in operation S230. Herein, the voice data language may be a base language based on which text data is converted into voice data.

If the vehicle determines that no voice data language is selected by the user, the vehicle may convert the received text data into voice data, based on a language set in the external apparatus, in operation S240. At this time, the vehicle may convert the received text data into voice data, with reference to an acoustic model and a language model corresponding to the language set in the external apparatus.

Meanwhile, if the vehicle determines that a voice data language is selected by the user, the vehicle may acquire voice data based on the voice data language, not the language set in the external apparatus, in operation S250.

As a result, it is possible to improve accuracy in recognizing a speech from a user who uses a language that is different from a language set in an external apparatus.

Figure 13:
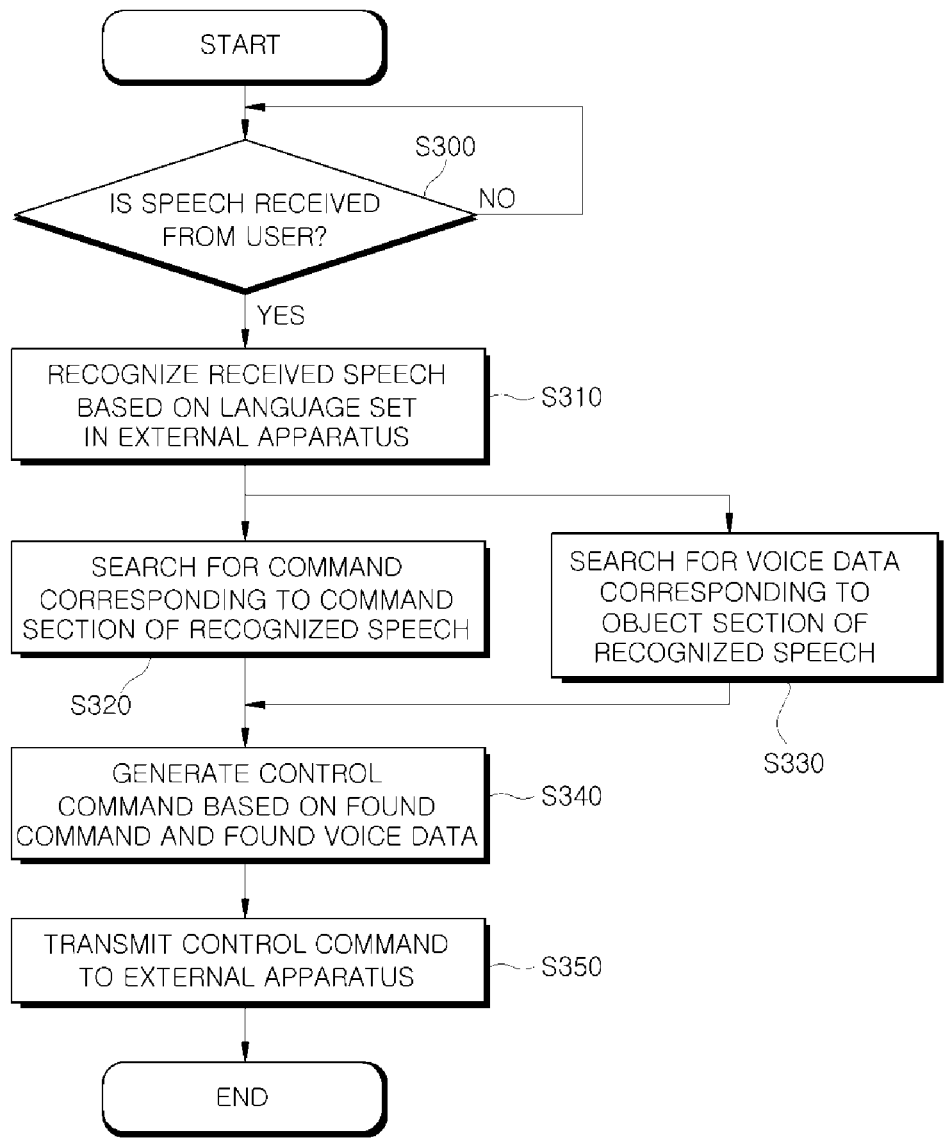
FIG. 13 is a flowchart illustrating a speech recognition operation in a vehicle control method according to an embodiment of the present disclosure.

FIG. 13 is a flowchart illustrating a speech recognition operation in a vehicle control method according to an embodiment of the present disclosure.

First, a vehicle may determine whether a speech is received from a user, in operation S300. If the vehicle determines that no speech is received from a user, the vehicle may continue to determine whether a speech is received from a user.

If the vehicle determines that a speech is received from a user, the vehicle may recognize the received speech based on a language set in an external apparatus, in operation S310. Herein, the external apparatus may be an apparatus that has transmitted text data converted into voice data and stored in advance in the vehicle.

At this time, the vehicle may recognize the received speech with reference to an acoustic model and a language model corresponding to the language set in the external apparatus.

Then, the vehicle may search for a command corresponding to a command section of the recognized speech, in operation S320. Also, the vehicle may search for voice data corresponding to an object section of the recognized speech, in operation S330. Herein, the voice data may have been stored in the vehicle according to the method described above with reference to FIG. 11 or 12.

Thereafter, the vehicle may generate a control command based on the found command and the found voice data, in operation S340. Finally, the vehicle may transmit the control command to the external apparatus, in operation S350. As a result, the external apparatus can be controlled according to the user's speech.

Accordingly, by performing speech recognition based on a language set in an external apparatus, it is possible to improve accuracy in recognizing a speech from a user who uses a language set in an external apparatus.

FIG. 14 is a flowchart illustrating a speech recognition operation in a vehicle control method according to another embodiment of the present disclosure.

First, a vehicle may determine whether a speech is received from a user, in operation S400. If the vehicle determines that no speech is received from a user, the vehicle may continue to determine whether a speech is received from a user.

If the vehicle determines that a speech is received from a user, the vehicle may determine whether a speech recognition language is selected by the user, in operation S410. Herein, the speech recognition language may be a base language of speech recognition.

If the vehicle determines that no speech recognition language is selected by a user, the vehicle may recognize the received speech based on a language set in an external apparatus, in operation S420. At this time, the vehicle may recognize the received speech with reference to an acoustic model and a language model corresponding to the language set in the external apparatus.

Meanwhile, if the vehicle determines that a speech recognition language is selected by a user, the vehicle may recognize the received speech based on the selected speech recognition language, in operation S430. At this time, the vehicle may recognize the received speech with reference to an acoustic model and a language model corresponding to the speech recognition language.

Then, the vehicle may search for a command corresponding to a command section of the recognized speech, in operation S440. Also, the vehicle may search for voice data corresponding to an object section of the recognized speech, in operation S450. Herein, the voice data may have been stored in the vehicle according to the method described above with reference to FIG. 11 or 12.

Thereafter, the vehicle may generate a control command based on the found command and the found voice data, in operation S460. Finally, the vehicle may transmit the control command to the external apparatus, in operation S470. As a result, the external apparatus may be controlled according to a user's speech.

Accordingly, by enabling a user to select a speech recognition language, it is possible to improve accuracy in recognizing a speech from the user even when the user uses a language that is different from a language set in an external apparatus.

According to an aspect of the vehicle and the control method thereof as described above, by performing speech recognition based on a language set in an external apparatus, not based on a language set in the vehicle, the accuracy of speech recognition may be improved.

According to another aspect of the vehicle and the control method thereof as described above, by converting data received from an external apparatus into voice data based on a language set in the external apparatus, the accuracy of speech recognition may be improved.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle, comprising:
a communication unit configured to receive text data stored in an external apparatus;
a data converter configured to convert the received text data into voice data;
a speech input unit configured to receive a speech from a user;
a speech recognizer configured to recognize the received speech using at least one of an acoustic model and a language model corresponding to a language that is set in the external apparatus; and
a controller configured to search for voice data corresponding to the recognized speech in the converted voice data, to generate a control command including the voice data found by the controller based on the recognized speech, and to transmit the control command to the external apparatus through the communication unit.

2. The vehicle according to claim 1, wherein the speech recognizer configures a state sequence according to the language that is set in the external apparatus, and compares the received speech to the state sequence.

3. The vehicle according to claim 1, wherein if the user selects a speech recognition language, the speech recognizer recognizes the received speech based on the speech recognition language selected by the user.

4. The vehicle according to claim 3, wherein the speech recognizer recognizes the received speech using at least one of an acoustic model and a language model corresponding to the selected speech recognition language.

5. The vehicle according to claim 1, wherein the speech recognizer sets a feature vector model according to the language that is set in the external apparatus, and compares the received speech to the feature vector model.

6. A vehicle comprising:
a communication unit configured to receive text data stored in an external apparatus;
a data converter configured to convert the received text data into voice data using at least one of an acoustic model and a language model corresponding to a language that is set in the external apparatus;

a speech input unit configured to receive a speech from a user;

a speech recognizer configured to recognize the received speech; and a controller configured to search for voice data corresponding to the recognized speech in the converted voice data, to generate a control command including the voice data found by the controller based on the recognized speech, and to transmit the control command to the external apparatus through the communication unit.

7. The vehicle according to claim 6, wherein the data converter converts the received text data into the voice data, with reference to a feature vector model corresponding to the language that is set in the external apparatus.

8. The vehicle according to claim 6, wherein the data converter converts the received text data into the voice data, with reference to a state sequence corresponding to the language that is set in the external apparatus.

9. The vehicle according to claim 6, wherein if the user selects a voice data language, the data converter converts the received text data into the voice data based on the voice data language selected by the user.

10. The vehicle according to claim 9, wherein the data converter converts the received text data into the voice data using at least one of an acoustic model and a language model corresponding to the voice data language selected by the user.

11. A control method of a vehicle, comprising steps of:
receiving text data stored in an external apparatus;
converting the received text data into voice data;
receiving a speech from a user;
recognizing the received speech using at least one of an acoustic model and a language model corresponding to a language that is set in the external apparatus;
searching for voice data corresponding to the recognized speech in the converted voice data;
generating a control command including the found voice data based on the recognized speech; and
transmitting the control command to the external apparatus.

12. The control method according to claim 11, wherein the step of recognizing the received speech comprises recognizing, if the user selects a speech recognition language, the received speech based on the speech recognition language selected by the user.

13. The control method according to claim 12, wherein the step of recognizing the received speech comprises recognizing the received speech using at least one of an acoustic model and a language model corresponding to the selected speech recognition language.

14. The control method according to claim 11, wherein the step of recognizing the received speech comprises:
setting a feature vector model according to the language that is set in the external apparatus; and
comparing the received speech to the feature vector model.

15. The control method according to claim 11, wherein the step of recognizing the received speech comprises:
configuring a state sequence according to the language that is set in the external apparatus; and comparing the received speech to the state sequence.

16. A control method of a vehicle, comprising steps of:
receiving text data stored in an external apparatus;
converting the received text data into voice data using at least one of an acoustic model and a language model corresponding to a language that is set in the external apparatus;
receiving a speech from a user;
recognizing the received speech;
searching for voice data corresponding to the recognized speech in the converted voice data; generating a control command including the found voice data, based on the recognized speech; and transmitting the control command to the external apparatus.

17. The control method according to claim 16, wherein the step of converting the received text data into the voice data comprises converting, if the user selects a voice data language, the received text data into the voice data based on the voice data language selected by the user.

18. The control method according to claim 17, wherein the step of converting the received text data into the voice data comprises converting the received text data into the voice data using at least one of an acoustic model and a language model corresponding to the voice data language selected by the user.

19. The control method according to claim 16, wherein the step of converting the received text data into the voice data comprises converting the received text data into the voice data, with reference to a feature vector model corresponding to the language that is set in the external apparatus.

20. The control method according to claim 16, wherein the step of converting the received text data into the voice data comprises converting the received text data into the voice data, with reference to a state sequence corresponding to the language that is set in the external apparatus.

* * * * *